US009632675B2

(12) United States Patent
Shang

(10) Patent No.: US 9,632,675 B2
(45) Date of Patent: Apr. 25, 2017

(54) INFORMATION PROCESSING METHOD AND ELECTRONIC DEVICE

(71) Applicant: Lenovo (Beijing) Co., Ltd., Beijing (CN)

(72) Inventor: Yanfeng Shang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 90 days.

(21) Appl. No.: 14/700,263

(22) Filed: Apr. 30, 2015

(65) Prior Publication Data
US 2016/0171736 A1    Jun. 16, 2016

(30) Foreign Application Priority Data

Dec. 10, 2014  (CN) .......................... 2014 1 0759062

(51) Int. Cl.
G06T 11/60    (2006.01)
G06T 7/00     (2006.01)
G06F 3/0484   (2013.01)
G06F 9/44     (2006.01)
G06F 3/0488   (2013.01)

(52) U.S. Cl.
CPC ...... *G06F 3/04842* (2013.01); *G06F 3/04886* (2013.01); *G06F 9/4443* (2013.01)

(58) Field of Classification Search
USPC .......................... 345/173, 642; 715/769, 770
See application file for complete search history.

(56) References Cited

U.S. PATENT DOCUMENTS

2009/0079699 A1* 3/2009 Sun ........................ G06F 3/0488
                                                345/173
2014/0075355 A1* 3/2014 Kim .................... H04M 1/7253
                                                715/769

* cited by examiner

*Primary Examiner* — Kimberly A Williams
(74) *Attorney, Agent, or Firm* — Brinks Gilson & Lione; G. Peter Nichols

(57) ABSTRACT

An information processing method and an electronic device are disclosed. The electronic device has a display unit and the method includes receiving a first operation for covering a first display region of the display unit; determining the first display region corresponding to the first operation, and thereby determining a second display region which is a part of or all of the first display region; analyzing a display object in the second display region to obtain first identification data satisfying a predetermined condition; and storing the first identification data.

11 Claims, 4 Drawing Sheets

INFORMATION PROCESSING METHOD AND ELECTRONIC DEVICE

This application claims priority to Chinese Patent Application No. 201410759062.0 filed on Dec. 10, 2014, the entire contents of which are incorporated herein by reference.

BACKGROUND

The present disclosure relates to the technical field of smart electronic device, and particularly to an information processing method and an electronic device.

There are increasingly more applications in a smart electronic device. Generally, a user needs to switch between different applications when using various kinds of applications at the same time. However, there is often such scenario in practice use, in which the user needs to use information in a certain interface of an application B when using an application A, but the user often cannot remember the information, and thus he/she needs to switch back to the related interface of the application B to check the information, and to switch to the application A again when finishing the check. Sometimes, when there is too much information content to be checked and the user cannot remember it at a time, he/she needs to switch between the application A and the application B multiple times. For example, the user has bought a product via an e-shopping website and has got an order number. When the user contacts the customer service to check the order state via telephone at a later time, the customer service will ask the user about the order number. However, the user often cannot remember the order number and needs to switch to the order interface of the e-shopping website from the calling interface to check the corresponding order number, and to switch back to the calling interface to continue the call from the order interface of the e-shopping website after checking. Sometimes, if the user does not remember the order number at a time, he/she needs to switch between the calling interface and the order interface multiple times, which brings a poor user experience. The switch between the applications is troublesome, and makes the user's operation complicated and low efficient.

SUMMARY

An information processing method and an electronic device are provided in embodiments of the present disclosure.

An information processing method is provided in an embodiment of the present disclosure, which is applied to an electronic device having a display unit, the method comprising: receiving a first operation for covering the first display region of the display unit; determining the first display region corresponding to the first operation, and thereby determining a second display region which is a part of or all of the first display region; analyzing a display object in the second display region to obtain first identification data satisfying a predetermined condition; and storing the first identification data.

Optionally, the information processing method further comprises: obtaining a first instruction to instruct displaying the first identification data, after storing the first identification data; determining a third display region of the display unit, and displaying the first identification data through the third display region.

Optionally, the information processing method further comprises: obtaining a second instruction to terminate displaying the first identification data after displaying the first identification data through the third display region; and deleting the first identification data displayed in the third display region, and deleting the first identification data stored in the electronic device.

Optionally, the information processing method further comprises: obtaining a second instruction to terminate displaying the first identification data after displaying the first identification data through the third display region; deleting the first identification data displayed in the third display region; obtaining a third instruction for deleting the stored first identification data; and deleting the first identification data stored in the electronic device in response to the third instruction.

Optionally, said determining a third display region of the display unit comprises: determining a preset default display region of the display unit as the third display region.

Optionally, said determining a third display region of the display unit comprises: determining whether a first application is running at foreground or not when obtaining the first instruction; if a first application is running at foreground, determining whether a specific region for displaying the first identification data is reserved in an interface of the first application; determining the specific region as the third display region if the specific region is reserved, and determining a preset default display region of the display unit as the third display region if the specific region is not reserved; and if the first application is not running at foreground, determining the preset default display region of the display unit as the third display region; wherein, the default display region is suspended at the top layer of the display unit.

Optionally, said analyzing the display object in the second display region to obtain first identification data comprises: taking a snapshot picture of the display object in the second display region as the first identification data; or performing a character recognition for the display object in the second display region, and taking a result of the character recognition as the first identification data; or taking a snapshot picture of the display object in the second display region, performing a character recognition for the snapshot picture, and taking a result of the character recognition as the first identification data.

An electronic device is provided in an embodiment of the present disclosure, the electronic device comprises: a display unit for displaying; a processing unit configured to receive a first operation for covering a first display region of the display unit; determine the first display region corresponding to the first operation, and determine a second display region which is a part of or all of the first display region; analyze a display object in the second display region to obtain first identification data satisfying a predetermined condition; and store the first identification data.

Optionally, the processing unit is further configured to: obtain a first instruction to instruct displaying the first identification data, after the first identification data is stored; determine a third display region of the display unit; and display the first identification data through the third display region.

Optionally, the processing unit is further configured to obtain a second instruction to terminate displaying the first identification data after the first identification data is displayed through the third display region; delete the first identification data displayed in the third display region, and delete the first identification data stored in the electronic device.

Optionally, the processing unit is further configured to obtain a second instruction to terminate displaying the first identification data after the first identification data is displayed through the third display region; delete the first identification data displayed in the third display region; obtain a third instruction for deleting the stored first identification data; and delete the first identification data stored in the electronic device in response to the third instruction.

Optionally, the processing unit is further configured to: determine a preset default display region of the display unit as the third display region.

Optionally, the processing unit is further configured to determine whether a first application is running at foreground or not when obtaining the first instruction; if a first application is running at the foreground, determine whether a specific region for displaying the first identification data is reserved in an interface of the first application; determine the specific region as the third display region if the specific region is reserved, and to determine a preset default display region of the display unit as the third display region if the specific region is not reserved; and if the first application is not running at the foreground, determine the preset default display region of the display unit as the third display region; the default display region is suspended at the top layer of the display unit.

Optionally, the processing unit is further configured to: take a snapshot picture of the display object as the first identification data; or perform a character recognition for the display object in the second display region, and take a result of the character recognition as the first identification data; or to take a snapshot picture of the display object in the second display region, to perform a character recognition for the snapshot picture, and to take a result of the character recognition as the first identification data.

A computer readable storage medium is provided in another embodiment of the present disclosure, which has stored therein computer program instructions which, when being executed by a processor of an electronic device, performs the method described above.

DETAILED DESCRIPTION

The technical solution of the present disclosure will be described in further detail with reference to the accompany drawings and the particular embodiments.

First Embodiment

Figure 1:
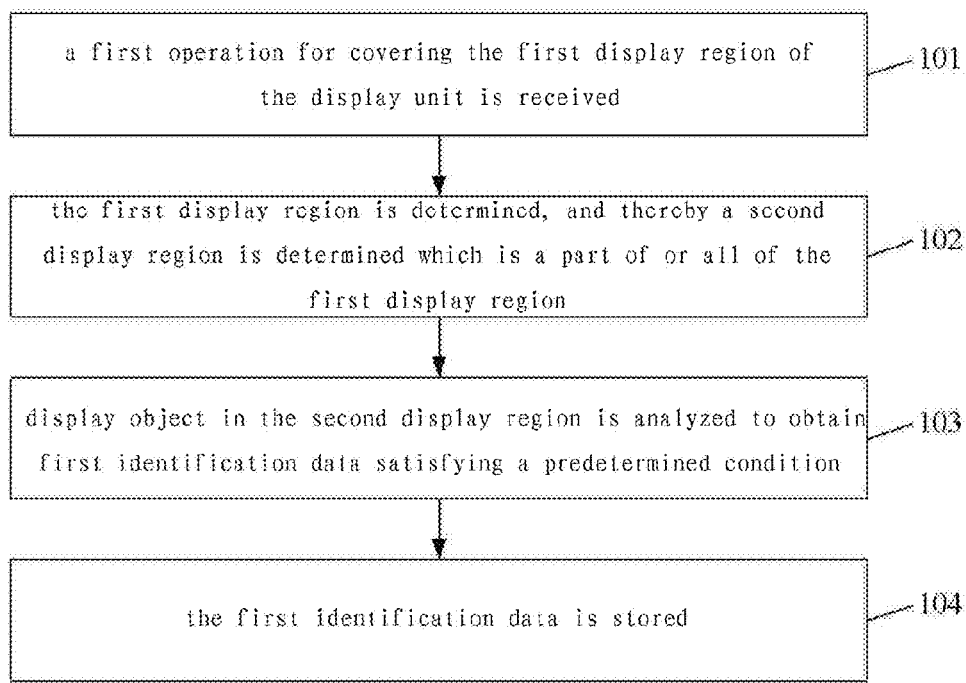
FIG. 1 is a flowchart showing an information processing method according to a first embodiment of the present disclosure.

In the first embodiment of the present disclosure, an information processing method is provided, which is applied to an electronic device comprising a display unit having a first display region. As shown in FIG. 1, the method comprises the following steps.

In a step 101, a first operation for covering the first display region of the display unit is received from a user.

The first operation is an operation in which the user covers the first display region of the display unit of the electronic device by finger or other body parts. For example, the user puts his/her finger to the first display region of the display unit in a horizontal direction to cover the first display region. The electronic device can capture the user's first operation by its display unit and trigger the subsequent processing.

In a step 102, the first display region is determined, and thereby a second display region is determined which is a part of or all of the first display region.

The electronic device determines the first display region corresponding to the first operation and further determines the second display region based on the determined first display region, after capturing the user's first operation. The second display region may be all of the first display region. That is, the second display region and the first display region are the same. Alternatively, the second display region may be a part of the first display region. That is, a part of the first display region meeting a condition is cut off from the first display region to be the second display region. The condition may be that it contains useful information. For example, only the character region is cut off from the first display region to be the second display region.

In a step 103, a display object in the second display region is analyzed to obtain first identification data satisfying a predetermined condition.

In an implementation, the step 103 comprises: taking a snapshot picture of the display object in the second display region, and taking the snapshot picture as the first identification data; or performing a character recognition for the display object in the second display region, and taking a result of the character recognition as the first identification data; or taking a snapshot picture of the display object in the second display region, performing a character recognition for the snapshot picture, and taking a result of the character recognition as the first identification data.

For example, when the second display region is all of the first display region, in the step 103, a snapshot picture of the display object in the second display region may be taken, and the snapshot picture may be taken as the first identification data. Also, in the step 103, a character recognition for the display object in the second display region may be performed, and a result of the character recognition may be taken as the first identification data. Also, in the step 103, a snapshot picture of a specific display object in the second display region may be taken, a character recognition for the snapshot picture may be performed, and a result of the character recognition may be taken as the first identification data.

When the second display region is a part of the first display region, in the step 103, a snapshot picture of the display object in the second display region may be taken, and the snapshot picture may be taken as the first identification data. Also, in the step 103, a character recognition for the display object in the second display region may be performed, and a result of the character recognition may be taken as the first identification data. Also, in the step 103, a snapshot picture of a specific display object in the second display region may be taken, a character recognition for the snapshot picture may be performed, and a result of the character recognition may be taken as the first identification data.

In a step 104, the first identification data is stored.

In an implementation, the method further comprises: obtaining a first instruction to instruct displaying the first identification data, after storing the first identification data; obtaining the stored first identification data, determining a third display region for displaying the first identification data, and displaying the first identification data through the third display region.

The first instruction may be triggered to be generated by the electronic device automatically after storing the first identification data, or may be triggered to be generated by a specific operation of the user after storing the first identification data.

The third display region may be a preset default display region in the display unit of the electronic device, or may be a specific display region reserved in the interface of the application running in the electronic device.

In an implementation, the step of determining a third display region for displaying the first identification data comprises: determining a preset default display region of the display unit as the third display region; or determining whether a first application is running at foreground or not when obtaining the first instruction; determining whether a specific region for rending the first identification data is reserved in an interface of the first application or not if the first application is running at foreground; determining the specific region as the third display region if it is reserved, and determining the preset default display region of the display unit as the third display region if it is not reserved; determining the preset default display region of the display unit as the third display region if no first application is running at foreground; wherein, a display attribute of the default display region of the display unit is the default display region being suspended at the top layer of the display unit.

In addition, in an implementation, the method further comprises: obtaining a second instruction to terminate displaying the first identification data after displaying the first identification data through the third display region; and deleting the first identification data displayed in the third display region, and deleting the first identification data stored in the electronic device.

In this implementation, the second instruction may be triggered to be generated by a specific operation of the user after the electronic device displays the first identification data through the third display region. The specific operation may be a touch of a specific key, either physical or virtual, or may be the user ending the first application providing the third display region, or the like.

In addition, in an implementation, the method further comprises: obtaining a second instruction to terminate displaying the first identification data after displaying the first identification data through the third display region; deleting the first identification data displayed in the third display region; obtaining a third instruction for deleting the stored first identification data; and deleting the first identification data stored in the electronic device.

In this implementation, the second instruction may be triggered to be generated by a specific operation of the user after the electronic device displays the first identification data through the third display region. The specific operation may be a touch of a specific key, either physical or virtual, or may be the user ending the first application providing the third display region, or the like. The third instruction may be triggered to be generated by a specific operation of the user after the electronic device deletes the first identification data displayed in the third display region. The specific operation may be a touch of a specific key, either physical or virtual, such as the user accessing the storage address of the first identification data in the electronic device and performing a deletion.

Second Embodiment

Figure 2:
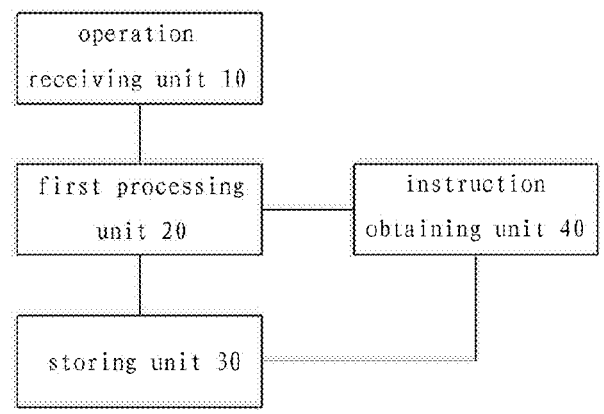
FIG. 2 is a schematic diagram showing a structure of an electronic device according to a second embodiment of the present disclosure.

Corresponding to the method in the first embodiment of the present disclosure, in a second embodiment of the present disclosure, an electronic device is provided, comprising a display unit having a first display region. As shown in FIG. 2, the electronic device further comprises: an operation receiving unit 10 operative to receive a first operation for covering the first display region of the display unit, from a user; a first processing unit 20 operative to determine the first display region, and thereby to determine a second display region which is a part of or all of the first display region; and to analyze a display object in the second display region to obtain first identification data satisfying a predetermined condition; and a storing unit 30 operative to store the first identification data.

In an implementation, the electronic device further comprises: an instruction obtaining unit 40 operative to obtain a first instruction to instruct displaying the first identification data, after the first identification data is stored; the first processing unit 20 is further operative to obtain the stored first identification data, to determine a third display region for displaying the first identification data, and to display the first identification data through the third display region.

In an implementation, the instruction obtaining unit 40 is further operative to obtain a second instruction to terminate displaying the first identification data after the first identification data is displayed; and the first processing unit 20 is further operative to delete the first identification data displayed in the third display region, and to delete the first identification data stored in the electronic device.

In an implementation, the instruction obtaining unit 40 is further operative to obtain a second instruction to terminate displaying the first identification data after the first identification data is displayed; the first processing unit 20 is further operative to operative to delete the first identification data displayed in the third display region; the instruction obtaining unit 40 is further operative to obtain a third instruction for deleting the stored first identification data; and the first processing unit 20 is further operative to delete the first identification data stored in the electronic device.

In an implementation, the first processing unit 20 is further operative: to determine a preset default display region of the display unit as the third display region; or to determine whether a first application is running at foreground or not when obtaining the first instruction; to determine whether a specific region for rending the first identification data is reserved in an interface of the first application or not if the first application is running at foreground; to determine the specific region as the third display region if it is reserved, and to determine the preset default display region of the display unit as the third display region if it is not reserved; to determine the preset default display region of the display unit as the third display region if no first application is running at foreground; wherein, a display attribute of the default display region of the display unit is the default display region being suspended at the top layer of the display unit.

In an implementation, the first processing unit 20 is further operative: to take a snapshot picture of the display object in the second display region, and to take the snapshot picture as the first identification data; or to perform a character recognition for the display object in the second display region, and to take a result of the character recognition as the first identification data; or to take a snapshot picture of the display object in the second display region, to perform a character recognition for the snapshot picture, and to take a result of the character recognition as the first identification data.

It is to be noted that the operation receiving unit 10, the first processing unit 20 and the instruction obtaining unit 40 may be realized by a CPU (Central Processing Unit), a MPU (Micro Processing Unit), a DSP (Digital Signal Processor), or a FPGA (Field Programmable Gate Array) in the electronic device. The storing unit 30 may be realized by a chip with a storage function in the electronic device.

Third Embodiment

In the third embodiment, the information processing method described in the first embodiment will be described in a further detail taking an example in which the first identification data is abstracted from a browser page, which mainly comprises the following processing procedure.

Figure 3:
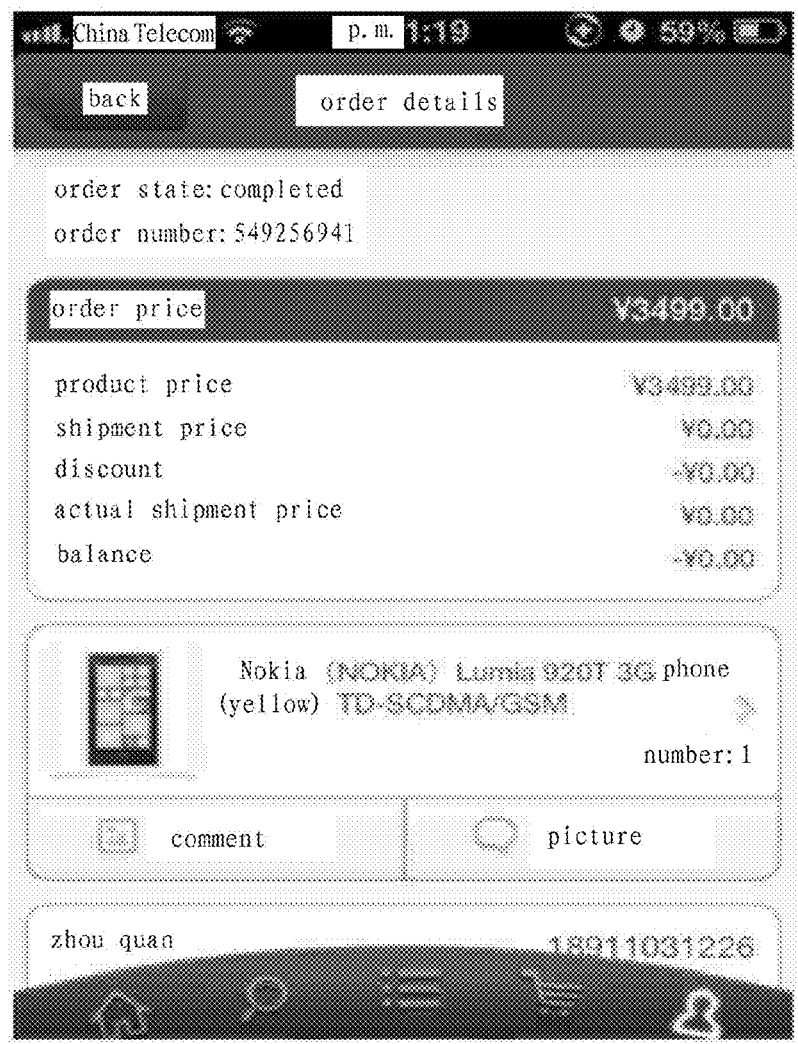
FIG. 3 is a first schematic diagram showing an information processing in the embodiment of the present disclosure.

The user is logged into a browser using the electronic device and accesses a shopping website. When the user purchases a product and completes the order, the browser is skipped to an order detail page of the shopping website, which is as shown in FIG. 3, displaying information such as the order state and the order number of the order, or the like.

Figure 4:
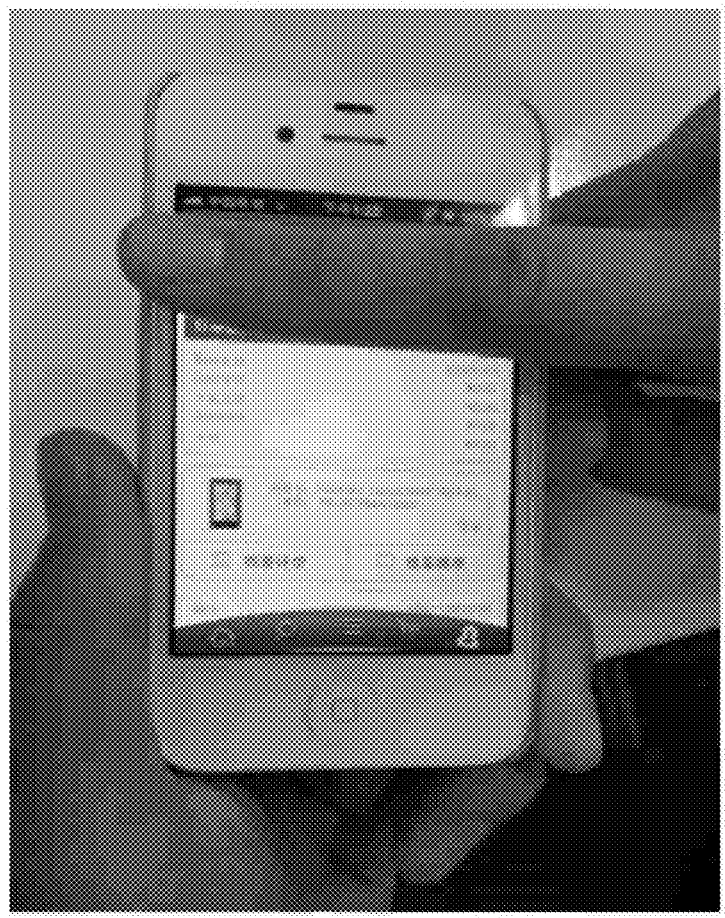
FIG. 4 is a second schematic diagram showing an information processing in the embodiment of the present disclosure.

The user wants to record the order state and the order number of the order. At this time, the user puts his/her finger to the first display region of the display unit of the electronic device in a horizontal direction, to cover the first display region. As shown in FIG. 4, the region covered by the user's finger is the first display region.

After the electronic device captures the operation of covering the display unit by the user, it determines the first display region corresponding to the covering operation, starts a timer to record the duration of the covering operation after capturing the covering operation on the display unit by the user, and triggers an operation for determining the first display region corresponding to the covering operation when the duration reaches a preset threshold. If the covering operation is ended before the duration has reached the preset threshold, it does not trigger the determination of the first display region corresponding to the covering operation.

After determining the first display region corresponding to the covering operation, the electronic device determines a second display region based on the determined first display region, wherein the second display region may be all of the first display region. That is, the second display region and the first display region are the same. Alternatively, the second display region may be a part of the first display region. That is, a part of the first display region meeting a condition is cut off from the first display region to be the second display region. The condition may be that it contains useful information. In the present embodiment, descriptions will be made taking an example in which the determined second display region is all of the first display region.

Figure 5:
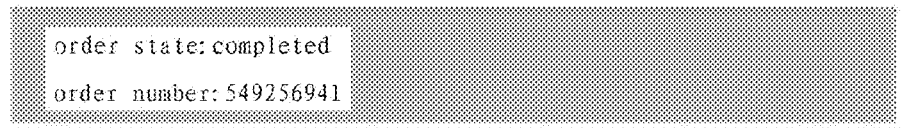
FIG. 5 is a third schematic diagram showing an information processing in the embodiment of the present disclosure.

After determining the second display region, the electronic device analyzes a display object in the second display region to obtain first identification data satisfying a predetermined condition. The electronic device may take a snapshot picture of the display object in the second display region, and take the snapshot picture as the first identification data. Alternatively, the electronic device may perform a character recognition for the display object in the second display region, and take a result of the character recognition as the first identification data. Alternatively, the electronic device may take a snapshot picture of the display object in the second display region (may be a picture comprising a part of the useful information), perform a character recognition for the snapshot picture, and take a result of the character recognition as the first identification data. In the present embodiment, descriptions will be made taking an example in which a snapshot picture of the display object in the second display region is taken, and the snapshot picture is taken as the first identification data. The snapshot picture of the display object in the second display region obtained in the present embodiment is as shown in FIG. 5, which shows information on the order state and the order number.

After obtaining the snapshot of the display object in the second display region, i.e., the first identification data described in the present embodiment, the electronic device stores the snapshot picture at a storage address which may be a preset address. For example, the snapshot picture is stored in a preset file holder.

The electronic device stores the first identification data, so that the user may invoke it at any time. Of course, the user may invoke the first identification data when using other applications of the electronic device, so that it avoids the troublesome operation of having to return to the browser application to acquire the information related to the first identification data.

It is to be noted that, after the electronic device stores the first identification data, if the first identification data needs to be invoked, a corresponding first instruction will be obtained by the electronic device. The electronic device obtains the stored first identification data based on the first instruction, determines a third display region for displaying the first identification data, and displays the first identification data through the third display region.

The first instruction may be triggered to be generated by the electronic device automatically after the first identification data is stored, or may be triggered to be generated by a specific operation of the user after the first identification data is stored.

The third display region may be a preset default display region in the display unit of the electronic device, or may be a specific display region reserved in the interface of the application running in the electronic device, wherein a display attribute of the default display region of the display unit is the default display region being suspended at the top layer of the display unit.

Fourth Embodiment

In the fourth embodiment, the information processing method described in the first embodiment will be described in a further detail taking an example in which the first identification data is abstracted from a browser page and is displayed in a calling interface of a communication application, which mainly comprises the following processing procedure.

The user is logged into a browser using the electronic device and accesses a shopping website. When the user purchases a product and completes the order, the browser is skipped to an order detail page of the shopping website, which is as shown in FIG. 3, displaying information such as the order state and the order number of the order, or the like.

The user wants to record the order state and the order number of the order. At this time, the user puts his/her finger to the first display region of the display unit of the electronic device in a horizontal direction, to cover the first display region. As shown in FIG. 4, the region covered by the user's finger is the first display region.

After the electronic device captures the operation of covering the display unit by the user, it determines the first display region corresponding to the covering operation, starts a timer to record the duration of the covering operation after capturing the covering operation on the display unit by the user, and triggers an operation for determining the first display region corresponding to the covering operation when the duration reaches a preset threshold. If the covering operation is ended before the duration has reached the preset threshold, it does not trigger the determination of the first display region corresponding to the covering operation.

After determining the first display region corresponding to the covering operation, the electronic device determines a second display region based on the determined first display region, wherein the second display region may be all of the first display region. That is, the second display region and the first display region are the same. Alternatively, the second display region may be a part of the first display region. That is, a part of the first display region meeting a condition is cut off from the first display region to be the second display region. The condition may be that it contains useful information. In the present embodiment, descriptions will be made taking an example in which the determined second display region is all of the first display region.

After determining the second display region, the electronic device analyzes a display object in the second display region to obtain first identification data satisfying a predetermined condition. The electronic device may take a snapshot picture of the display object in the second display region, and take the snapshot picture as the first identification data. Alternatively, the electronic device may perform a character recognition for the display object in the second display region, and take a result of the character recognition as the first identification data. Alternatively, the electronic device may take a snapshot picture of the display object in the second display region (may be a picture comprising a part of the useful information), perform a character recognition for the snapshot picture, and take a result of the character recognition as the first identification data. In the present embodiment, descriptions will be made taking an example in which a snapshot picture of the display object in the second display region is taken, and the snapshot picture is taken as the first identification data. The snapshot picture of the display object in the second display region obtained in the present embodiment is as shown in FIG. 5, which shows information on the order state and the order number.

After obtaining the snapshot of the display object in the second display region, i.e., the first identification data described in the present embodiment, the electronic device stores the snapshot picture.

Figure 6:
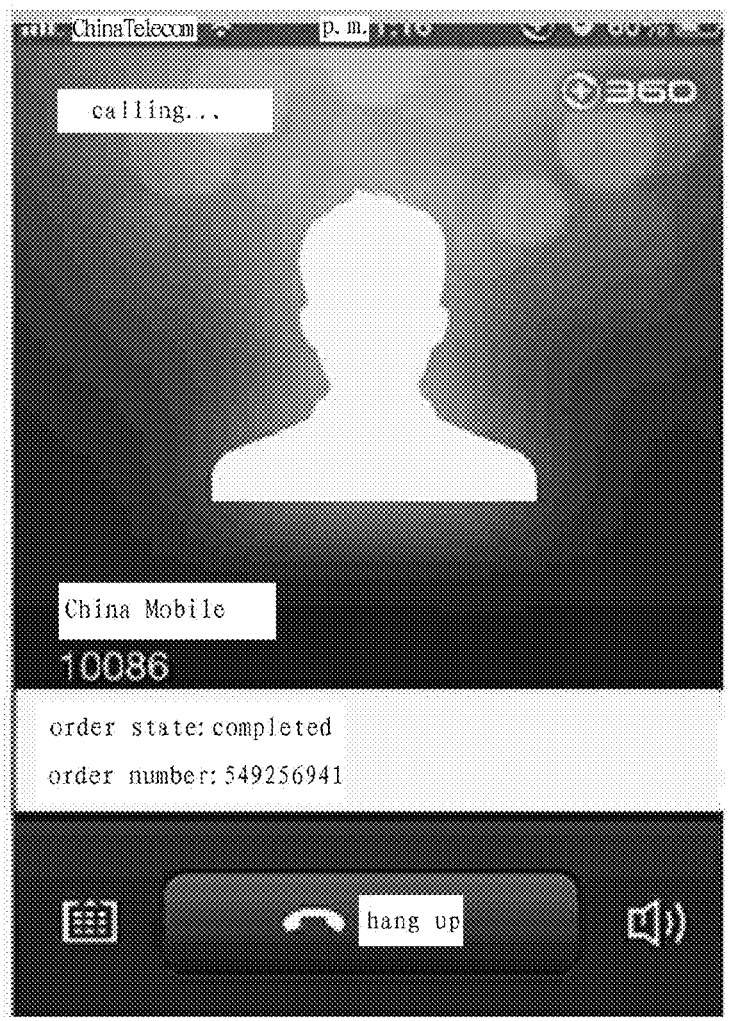
FIG. 6 is a fourth schematic diagram showing an information processing in the embodiment of the present disclosure.

After the electronic device stores the first identification data, the electronic device starts a voice calling application. When the voice calling application is running and the user is in a call with another party, the user triggers an operation for invoking the first identification data. The electronic device then obtains the corresponding first instruction, obtains the stored first identification data based on the first instruction, and determines whether a specific region for rending the first identification data is reserved in the calling interface of the voice calling application or not. The electronic device determines the specific region as the third display region if it is reserved, and determines the preset default display region of the display unit as the third display region if it is not reserved. In the present embodiment, the specific region for rendering the first identification data is reserved in the calling interface of the voice calling application, thereby the electronic device inserts the obtained first identification data into the specific region reserved in the calling interface of the voice calling application to display it. The display effect in the present embodiment is as shown in FIG. 6.

When the user ends the voice calling application, the electronic device obtains the second instruction, and deletes the first identification data displayed in the specific region reserved in the calling interface of the voice calling application based on the second instruction. As an optional implementation, the electronic device may delete the first identification data stored in the electronic device at the same time when deleting the first identification data displayed in the specific region reserved in the calling interface of the voice calling application. As another optional implementation, the electronic device may delete the first identification data stored in the electronic device when receiving a third instruction triggered by the user's operation, after deleting the first identification data displayed in the specific region reserved in the calling interface of the voice calling application.

Fifth Embodiment

In the fifth embodiment, the information processing method described in the first embodiment will be described in a further detail still taking an example in which the first identification data is abstracted from a browser page and is displayed in a calling interface of a communication application, which mainly comprises the following processing procedure.

The electronic device starts the voice calling application, and when the voice calling application is running and the user is in a call with another party, the user wants to check the order information to control the electronic device to switch from the calling interface of the voice calling application to the interface of the browser, and access the order detail page of the shopping website by the browser, which is as shown in FIG. 3 showing information such as the order state and the order number of the order, or the like.

The user wants to record the order state and the order number of the order. At this time, the user puts his/her finger to the first display region of the display unit of the electronic device in a horizontal direction, to cover the first display region. As shown in FIG. 4, the region covered by the user's finger is the first display region.

After the electronic device captures the operation of covering the display unit by the user, it determines the first display region corresponding to the covering operation, starts a timer to record the duration of the covering operation after capturing the covering operation on the display unit by the user, and triggers an operation for determining the first display region corresponding to the covering operation when the duration reaches a preset threshold. If the covering operation is ended before the duration has reached the preset threshold, it does not trigger the determination of the first display region corresponding to the covering operation.

After determining the first display region corresponding to the covering operation, the electronic device determines a second display region based on the determined first display region, wherein the second display region may be all of the first display region. That is, the second display region and the first display region are the same. Alternatively, the second display region may be a part of the first display region. That is, a part of the first display region meeting a condition is cut off from the first display region to be the second display region. The condition may be that it contains useful information. In the present embodiment, descriptions will be made taking an example in which the determined second display region is all of the first display region.

After determining the second display region, the electronic device analyzes a display object in the second display region to obtain first identification data satisfying a predetermined condition. The electronic device may take a snapshot picture of the display object in the second display region, and take the snapshot picture as the first identification data. Alternatively, the electronic device may perform a character recognition for the display object in the second display region, and take a result of the character recognition as the first identification data. Alternatively, the electronic device may take a snapshot picture of the display object in the second display region (may be a picture comprising a part of the useful information), perform a character recognition for the snapshot picture, and take a result of the character recognition as the first identification data. In the present embodiment, descriptions will be made taking an example in which a snapshot picture of the display object in the second display region is taken, and the snapshot picture is taken as the first identification data. The snapshot picture of the display object in the second display region obtained in the present embodiment is as shown in FIG. 5, which shows information on the order state and the order number.

After obtaining the snapshot of the display object in the second display region, i.e., the first identification data described in the present embodiment, the electronic device stores the snapshot picture. After the electronic device stores the first identification data, the electronic device generates a first instruction automatically, and obtains the stored first identification data based on the first instruction. The electronic device determines whether a specific region for rendering the first identification data is reserved in the calling interface of the voice calling application or not. The electronic device determines the specific region as the third display region if it is reserved, and determines the preset default display region of the display unit as the third display region if it is not reserved. In the present embodiment, the specific region for rendering the first identification data is reserved in the calling interface of the voice calling application, thereby the electronic device inserts the obtained first identification data into the specific region reserved in the calling interface of the voice calling application to display it. The display effect in the present embodiment is as shown in FIG. 6.

When the user ends the voice calling application, the electronic device obtains the second instruction, and deletes the first identification data displayed in the specific region reserved in the calling interface of the voice calling application based on the second instruction. As an optional implementation, the electronic device may delete the first identification data stored in the electronic device at the same time when deleting the first identification data displayed in the specific region reserved in the calling interface of the voice calling application. As another optional implementation, the electronic device may delete the first identification data stored in the electronic device when receiving a third instruction triggered by the user's operation, after deleting the first identification data displayed in the specific region reserved in the calling interface of the voice calling application.

In the present embodiment of the present disclosure, the electronic device is triggered to store the first identification data displayed in the first display region of the display unit of the electronic device by a user's specific operation, so that the user may invoke it at any time. Of course, the electronic device may invoke the first identification data when running other application, and display the invoked first identification data in a proper region of the display unit of the electronic device, which enables the user to check the first identification data without a switch of the applications when using other applications, and ensures the normal running of the applications. With the embodiment of the present disclosure, it avoids the troublesome operation of having to return to the browser application to acquire the information related to the first identification data, the operation complexity of the electronic device is decreased, and the operation efficiency is improved.

In the several embodiment provided in the present disclosure, it should be understood that the disclosed methods, apparatuses and electronic devices may be realized in other ways. The device embodiments described above are only exemplary. For example, the divisions to the units are only a division in terms of logical function. There may be other division ways in practical implementation. For example, multiple units or components may be combined or integrated into another system, or some features may be omitted or not performed. In addition, the coupling, the direct coupling or the communication connection between the components as shown or discussed may be an indirect coupling or a communication connection between devices or units electrically, mechanically or in other ways.

The units described above as separate components may be, or may not be separated physically. The components shown as units may be, or may not be, physical units, which may be located at one place, or be distributed among multiple networked units. Part of, or all of units may be selected to achieve the purpose of the technical solutions of the embodiments according to practical requirement.

In addition, the functional units in the embodiments of the present disclosure may be integrated in one processing unit totally, or the units may be units individually, or two or more than two units are integrated as one unit. The integrated units may be realized by hardware, or by hardware in combination with software units.

Those of ordinary skill in the art may understand that all or part of the steps realizing the method embodiments may be realized by program instruction related hardware. The program may be stored in a computer readable storage medium which performs the steps of the method embodiments when being executed. The storage medium includes a medium capable of storing program code, such as a mobile storage device, a ROM (Read-Only Memory), a RAM (Random Access Memory), a magnetic disk or an optical disk, or the like.

Alternatively, if the integrated units described above in the embodiments of the present disclosure are realized by software functional module and are sold or used as a separate product, they may be stored in a computer readable storage medium. Based on such understanding, the technical solution of the present disclosure in essence, or the parts contributing to the prior art, may be realized in a way of software product, which is stored in a storage medium comprising several instructions for causing a computer device (a PC, a sever, a network device, or the like) to perform all or part of the method described in the embodiments of the present disclosure. The storage medium includes a medium capable of storing program code, such as a mobile storage device, a ROM (Read-Only Memory), a RAM (Random Access Memory), a magnetic disk or an optical disk, or the like.

The above is only particular implementation of the present disclosure. The protection scope of the present disclosure is not limited thereto. Any change or substitution easily conceivable by those skilled in the art in the technical scope disclosed by the present disclosure shall fall within the protection scope of the present disclosure. Therefore, the protection scope of the present disclosure should be defined by the protection scope of the claims.

The invention claimed is:

1. An information processing method applied to an electronic device having a display unit, the method comprising:
   receiving a first operation for covering a first display region of the display unit;
   determining the first display region corresponding to the first operation, and thereby determining a second display region which is a part of or all of the first display region;
   analyzing a display object in the second display region to obtain first identification data satisfying a predetermined condition;
   storing the first identification data;
   obtaining a first instruction to instruct displaying the first identification data, after storing the first identification data;
   determining a third display region of the display unit; and
   displaying the first identification data through the third display region,
   wherein said determining a third display region of the display unit comprises:
   determining whether a first application is running at foreground or not when obtaining the first instruction;
   if a first application is running at foreground, determining whether a specific region for displaying the first identification data is reserved in an interface of the first application; determining the specific region as the third display region if the specific region is reserved, and determining a preset default display region of the display unit as the third display region if the specific region is not reserved; and
   if the first application is not running at foreground, determining the preset default display region of the display unit as the third display region;
   wherein, the default display region being suspended at the top layer of the display unit.

2. The information processing method of claim 1, further comprising:
   obtaining a second instruction to terminate displaying the first identification data after displaying the first identification data through the third display region; and
   deleting the first identification data displayed in the third display region, and deleting the first identification data stored in the electronic device.

3. The information processing method of claim 1, further comprising:
   obtaining a second instruction to terminate displaying the first identification data after displaying the first identification data through the third display region;
   deleting the first identification data displayed in the third display region;
   obtaining a third instruction for deleting the stored first identification data; and
   deleting the first identification data stored in the electronic device in response to the third instruction.

4. The information processing method of claim 1, wherein the determining a third display region of the display unit comprises determining a preset default display region of the display unit as the third display region.

5. The information processing method of claim 1, wherein the analyzing the display object in the second display region to obtain first identification data comprises:
   taking a snapshot picture of the display object in the second display region as the first identification data; or
   performing a character recognition for the display object in the second display region, and taking a result of the character recognition as the first identification data; or
   taking a snapshot picture of the display object in the second display region, performing a character recognition for the snapshot picture, and taking a result of the character recognition as the first identification data.

6. An electronic device comprising:
   a display unit for displaying; and
   a processing unit configured to:
   receive a first operation for covering a first display region of the display unit;
   determine the first display region corresponding to the first operation, and determine a second display region which is a part of or all of the first display region;
   analyze a display object in the second display region to obtain first identification data satisfying a predetermined condition;
   store the first identification data;
   obtain a first instruction to instruct displaying the first identification data after the first identification data is stored;
   determine a third display region of the display unit; and
   display the first identification data through the third display region,
   wherein the processing unit is further configured to:
   determine whether a first application is running at foreground or not when obtaining the first instruction;
   if a first application is running at the foreground, determine whether a specific region for displaying the first identification data is reserved in an interface of the first application; determine the specific region as the third display region if the specific region is reserved, and determine a preset default display region of the display unit as the third display region if the specific region is not reserved; and
   if the first application is not running at the foreground, determine the preset default display region of the display unit as the third display region;
   wherein, the default display region being suspended at the top layer of the display unit.

7. The electronic device of claim 6, wherein the processing unit is further configured to:
   obtain a second instruction to terminate displaying the first identification data after the first identification data is displayed through the third display region;
   delete the first identification data displayed in the third display region, and
   delete the first identification data stored in the electronic device.

8. The electronic device of claim 6, wherein the processing unit is further configured to:
   obtain a second instruction to terminate displaying the first identification data after the first identification data is displayed through the third display region;
   delete the first identification data displayed in the third display region;
   obtain a third instruction for deleting the stored first identification data; and
   delete the first identification data stored in the electronic device in response to the third instruction.

9. The electronic device of claim 6, wherein the processing unit is further configured to determine a preset default display region of the display unit as the third display region.

10. The electronic device of claim 6, wherein, the processing unit is further configured to:
- take a snapshot picture of the display object as the first identification data; or
- perform a character recognition for the display object in the second display region, and take a result of the character recognition as the first identification data; or
- take a snapshot picture of the display object in the second display region, perform a character recognition for the snapshot picture, and take a result of the character recognition as the first identification data.

11. A non-transitory computer readable storage medium having stored therein computer program instructions which, when being executed by a processor of an electronic device, performs the method of claim 1.

* * * * *